United States Patent [19]

Hosokawa

[11] Patent Number: 4,718,521
[45] Date of Patent: Jan. 12, 1988

[54] BICYCLE CALIPER BRAKE ASSEMBLY
[75] Inventor: Mikio Hosokawa, Fukui, Japan
[73] Assignee: Maeda Industries, Ltd., Osaka, Japan
[21] Appl. No.: 943,427
[22] Filed: Dec. 19, 1986
[30] Foreign Application Priority Data
 Dec. 19, 1985 [JP] Japan .................. 60-195980[U]
[51] Int. Cl.[4] .......................... F16D 65/48; B60L 1/12
[52] U.S. Cl. ................................ 188/24.19; 188/71.7
[58] Field of Search ............... 188/2 D, 24.19, 71.7, 188/196 M, 196 BA

[56] References Cited
U.S. PATENT DOCUMENTS
4,151,897 5/1979 Schoch ........................ 188/24.19
4,591,026 5/1986 Nagano ..................... 188/24.19 X FOREIGN PATENT DOCUMENTS
56-15117 4/1981 Japan .

Primary Examiner—Duane A. Reger
Attorney, Agent, or Firm—Birch, Stewart, Kolasch & Birch

[57] ABSTRACT

A bicycle caliper brake assembly having a first caliper having a connecting portion provided with a boss rotatably and axially movably receiving a rotary member. A second caliper includes a connecting portion connected to an outer cable of a double type control cable. A pivotal adjusting lever is provided for rotating the rotary member. A cable retainer is eccentrically mounted on the rotary member and connected to an inner cable of the control cable. The boss is formed at one end face thereof with a first annular row of teeth. The rotary member is formed with a second annular row of teeth engageable with and disengageable from the first row of teeth in response to axial movement of the rotary member. A corrugated ring spring is provided which is interposed between the lever and the other end face of the boss.

8 Claims, 8 Drawing Figures

BICYCLE CALIPER BRAKE ASSEMBLY

BACKGROUND OF THE INVENTION

1. Field of the Invention

This invention relates to a bicycle caliper brake assembly, and more particularly to improvements in such a brake assembly which enables quick enlargement of an interval between a pair of brake shoes for ready wheel replacement.

2. Description of the Background Art

Most commonly used for bicycles is a side pull type caliper brake assembly which comprises a pair of calipers pivotally supported by a common support shaft and respectively retaining a pair of brake shoes in facing relation to both side walls of a bicycle wheel rim. The pair of calipers are always biased by a return spring so that the brake shoes are kept spaced from the wheel rim in a non-braking position. One of the calipers has a connecting portion connected to an outer cable of a double type control cable. The other of the calipers also has a connecting portion connected to an inner cable of the control cable which, when pulled up by a remote brake lever, causes the brake shoes to come into braking contact with the wheel rim against the biasing force of the return spring.

Generally, in such brake assembly, the brake shoes in their non-braking position are held as close to the wheel rim as possible in order to provide a quick response upon braking operation of the brake lever (hence a small play in braking). As a result, the interval between the brake shoes in their non-braking position is smaller than the width of a wheel tire (but larger than the width of the wheel rim). Thus, it is impossible to remove the wheel for replacement or repair.

One way to disassemble the wheel is to adjust the effective length of the inner cable or the outer cable by the use of screw means so that the interval between the brake shoes is temporarily enlarged enough for free passage of the wheel between the brake shoes. However, this measure requires a lot of time and is particularly disadvantageous in bicycle races or competitions where loss of time is vital.

In an attempt to meet the requirements for quick and ready wheel replacement, Japanese Utility Model Publication No. 56-15117 (Published: Apr. 9, 1981; application No. 53-93245; Filed: July 5, 1978; Applicant: Maeda Industries, Ltd; Inventors: Nobuo OZAKI et al) discloses a side pull type bicycle caliper brake assembly which has the same basic arrangement as described hereinbefore and additionally comprises a mechanism for quickly enlarging the interval between a pair of brake shoes in their non-braking position.

Such mechanism comprises a boss provided on a connecting portion of one caliper, a rotary member rotatably fitted in the boss and formed with an eccentric axial bore, and a cable retainer connected to an inner cable of a double type control cable and having a shaft inserted in the eccentric axial bore of the rotary member. The rotary member is also formed with an end flange facing one end face of the boss. The rotary member is rotated within a limited range by a pivotal adjusting lever connected thereto. The mechanism further includes a corrugated ring spring which urges the rotary member so that the end flange thereof comes into pressing contact with the one end face of the boss.

When the pivotal adjusting lever is in its lower limit position, the cable retainer is at a lower dead point with the pair of brake shoes spaced by a minimum interval. On the other hand, when the lever is pivoted to its upper limit position to bring the cable retainer to an upper dead point, the interval between the pair of brake shoes is increased to a maximum extent to allow free passage of a wheel between the pair of brake shoes for quick and ready replacement thereof.

The interval enlarging mechanism described above, however, has a disadvantage that the cable retainer cannot be held at a position intermediate the lower dead point and the upper dead point because a tensile force always applied to the inner cable acts to displace the cable retainer to the upper dead point due to the eccentricity of the cable retainer. Thus, it is impossible to use the interval enlarging mechanism also as a means for adjusting a play in braking operation.

The corrugated ring spring is intended to provide a frictional resistance between the rotary member and the boss which is sufficient to frictionally hold the cable retainer at any position between the lower dead point and the upper dead point against the tensile force acting on the inner cable. Contrary to such expectation, the actual frictional resistance imparted by the corrugated ring spring alone fails to serve the intended purpose.

SUMMARY OF THE INVENTION

It is, therefore, an object of the present invention to provide a bicycle caliper brake assembly incorporating a mechanism which serves to adjust the interval between a pair of brake shoes from a minimum to a maximum or vice versa and which also serves to adjust such interval to any value intermediate the minimum and the maximum.

According to the invention, there is provided a bicycle caliper brake assembly comprising first and second calipers each pivotally supported by a support shaft. The calipers respectively having shoe support portions which support a pair of brake shoes on both sides of a bicycle wheel rim and which are always biased away from each other. The second caliper includes a connecting portion connected to an outer cable of a double type control cable. The first caliper includes a connecting portion provided with a boss. A rotary member is rotatably fitted in the boss and axially movable in the boss within a limited range. A pivotal adjusting lever is provided for rotating the rotary member within a limited range. A cable retainer is mounted eccentrically on the rotary member for connection to an inner cable of the control cable and is displaced between a lower dead point and an upper dead point when the rotary member is rotated by the lever. The boss is formed at one end thereof with a first annular row of teeth. The rotary member is formed with a second annular row of teeth which is engageable with and disengageable from the first row of teeth in response to axial movement of the rotary member. Elastic means are provided for urging the rotary member to bring the second row of teeth into engagement with the first row of teeth.

Other objects, features and advantages of the invention will become apparent from the following detailed description given with reference to the accompanying drawings.

DESCRIPTION OF THE PREFERRED EMBODIMENTS

Figure 1:
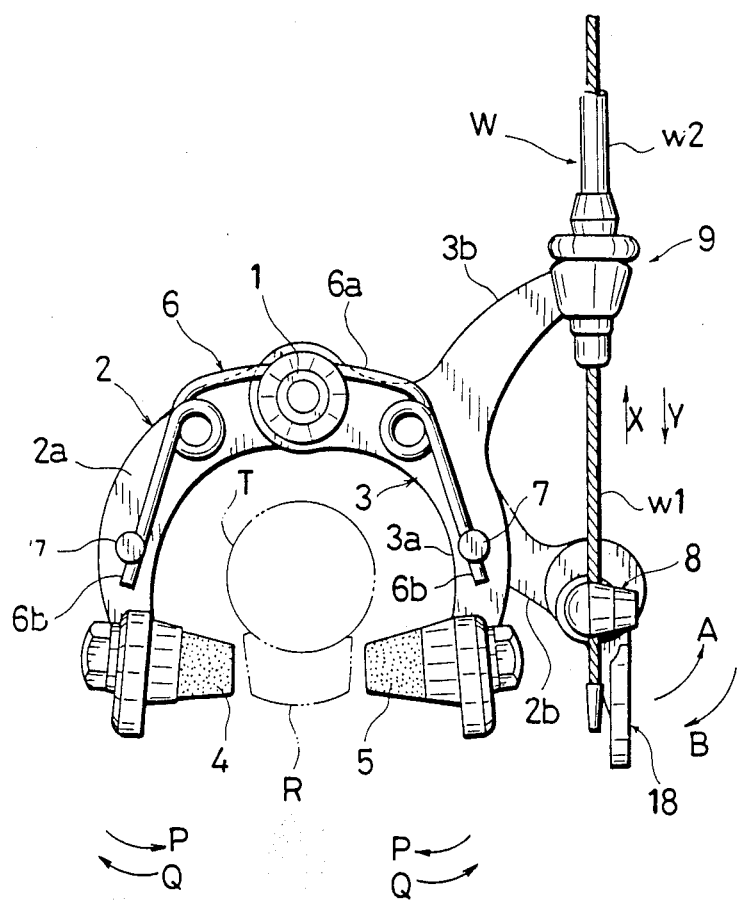
FIG. 1 is a front elevation illustrating a bicycle caliper brake assembly of the invention with a pair of brake shoes minimally spaced from each other.
Figure 2:
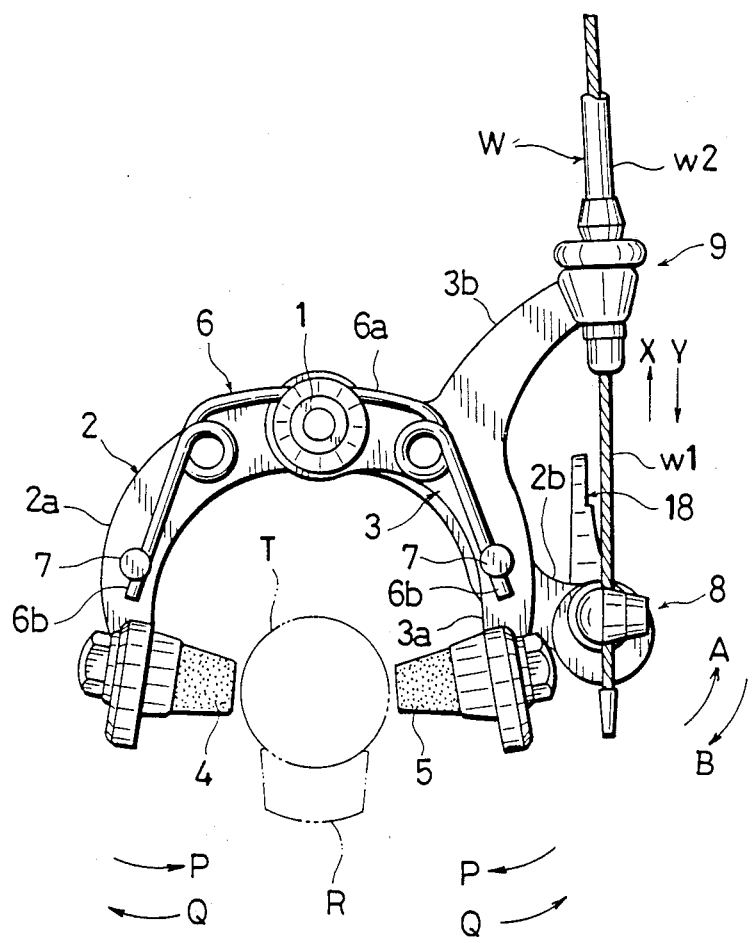
FIG. 2 is a view similar to FIG. 1 but illustrating the same brake assembly with the pair of brake shoes maximally spaced from each other.
Figure 3:
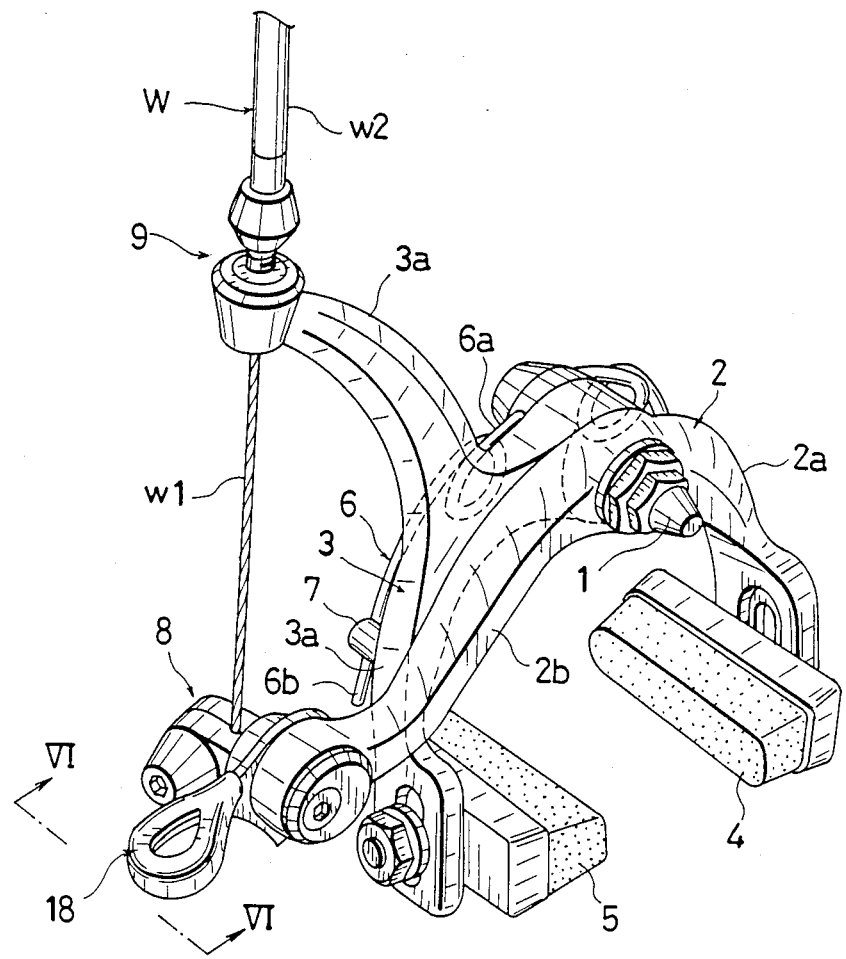
FIG. 3 is a perspective view, somewhat enlarged, illustrating the same brake assembly with the pair of brake shoes intermediately spaced from each other.

Referring now to the accompanying drawings, first particularly to FIGS. 1 to 3, a bicycle caliper brake assembly comprises a pair of brake calipers, namely a first caliper 2 and a second caliper 3, which are pivotally supported on a common support shaft 1 fixed to a suitable part of a bicycle frame (not shown).

The first caliper 2 has a curved shoe support portion 2a which extends downward from the support shaft 1 substantially along one half of a wheel tire T. An inwardly directed brake shoe 4 is mounted on the free end of the shoe support section 2a to face one side wall of a wheel rim R (FIG. 1).

The second caliper 3 also has a curved shoe support portion 3a which extends downward from the support shaft 1 substantially along the other half of the tire T to support at its free end another inwardly directed brake shoe 5 facing the other side wall of the rim R.

The respective shoe support portions 2a, 3a of the first and second calipers 2, 3 are always urged away from each other by a return spring 6 in the form of a spring wire, so that the respective brake shoes 4, 5 are normally kept slightly spaced from the corresponding side walls of the rim R, as shown in FIG. 1. More specifically, the return spring 6 has a central portion 6a fixed to the support shaft 1 and a pair of side legs 6b which extend downward to engage from inside with a pair of engaging projections 7 provided on the shoe support portions 2a, 3a adjacent to the respective brake shoes 4, 5.

The first caliper 2 further has a connecting portion 2b which also extends downward from the support shaft 1 but is positioned on the side of the support shaft 1 opposite to the shoe support portion 2a. The free end of the connecting portion 2b is connected to an inner cable w1 of a double type control cable W by means of a first cable retainer 8 whose details will be described hereinafter.

The inner cable w1 of the control cable W has an unillustrated remote end connected to a brake lever (not shown). Thus, the inner cable w1 extends in tension between the brake lever and the first cable retainer 8.

Similarly to the first caliper 2, the second caliper 3 also has a connecting portion 3b which extends obliquely upward from an intermediate portion of the shoe support portion 3a. The connecting portion 3a of the second caliper 3 is connected at its free end to an outer cable w2 of the control cable W via a known second cable retainer 9.

Figure 4:
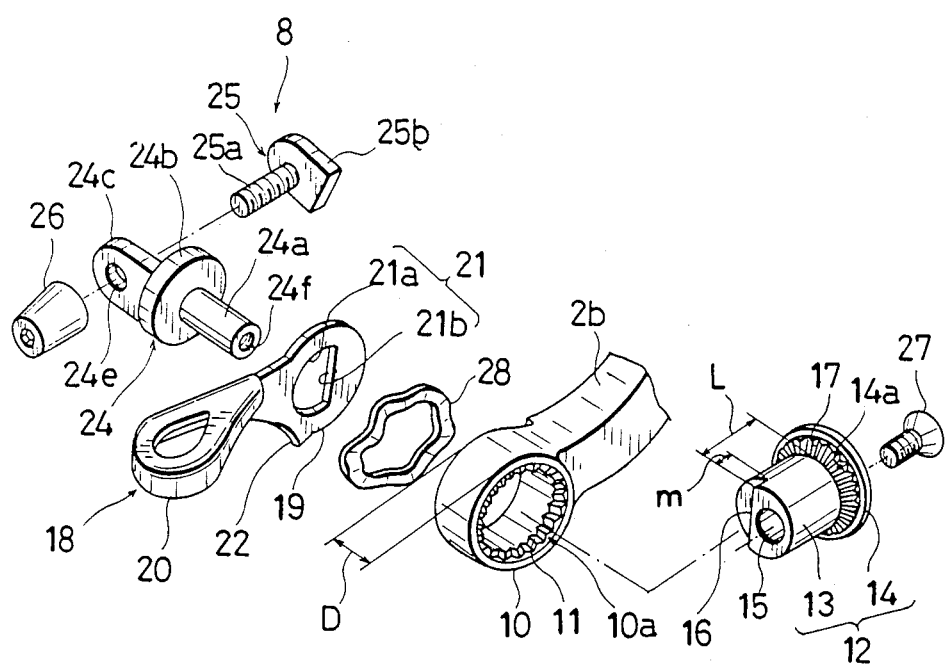
FIG. 4 is an exploded perspective view showing a principal portion of the same brake assembly.
Figure 5:
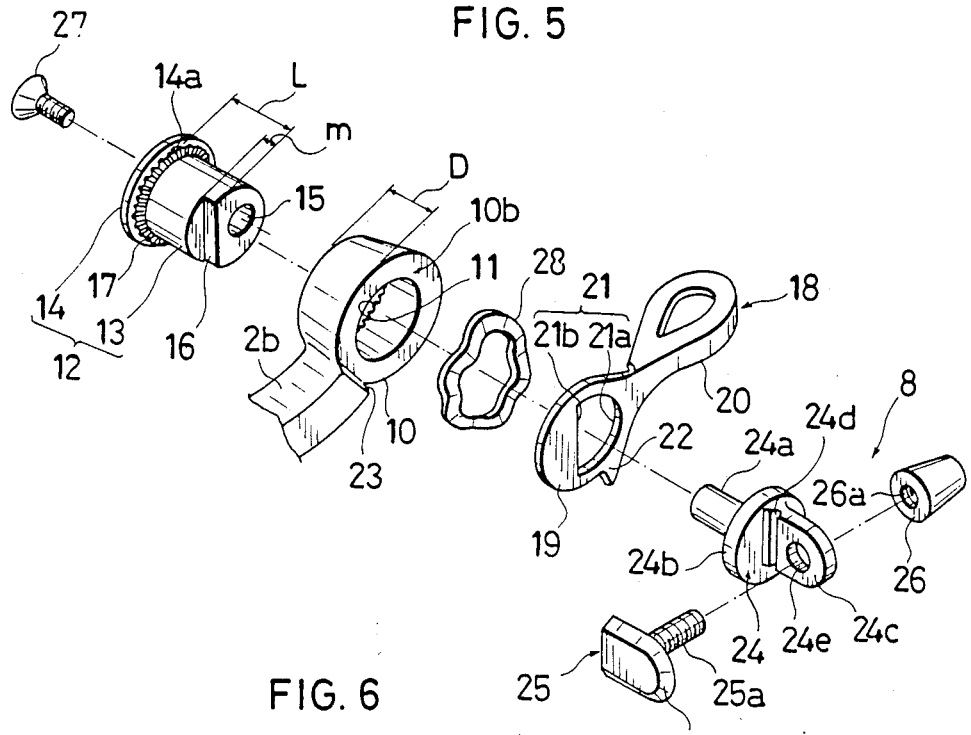
FIG. 5 is also an exploded perspective view showing the same principle portion as seen in another direction.
Figure 6:
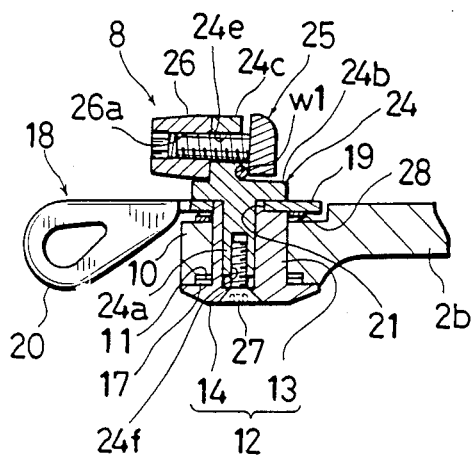
FIG. 6 is a section taken on lines VI—VI FIG. 3.

As illustrated in FIGS. 4 to 6, the free end of the connecting portion 2b of the first caliper 2 is provided in the form of a cylindrical boss 10 whose axis extends substantially parallel to the support shaft 1 (FIG. 3). The boss 10 has one end face 10a formed with a first annular row of radially extending teeth 11 as best illustrated in FIG. 4. The other annular end face 10b of the boss 10 is flat as apparent from FIG. 5.

Into the boss 10 is rotatably inserted a rotary member 12 which has a cylindrical portion 13 and an annular end flange so tha end flange 14 comes into contact with the teeth on the end face 10a of the boss 10. The cylindrical portion 13 is formed with an axially extending bore 15 which is eccentric by a predetermined amount relative to the central axis (not shown) of the cylindrical portion 13. The non-flanged or forward end of the cylindrical portion 13 is partially cut away to provide an axially extending flat surface 16. One side surface 14a of the end flange 14 opposed to the teeth on the end face 10a of the boss 10 is formed with a second annular row of radially extending teeth 17 for engagement with the first row teeth 11 of the boss 10.

The length L of the cylindrical portion 13 of the rotary member 12 is larger than the length D of the boss 10 by an amount m. Thus, when assembled, the non-flanged end of the cylindrical portion 13 projects out beyond the flat annular end face 10b of the boss 10 as shown in FIG. 6, thereby providing some room for slight axial reciprocating movement of the rotary body 12 relative to the boss 10.

The rotary member 12 is rotated by an adjusting lever 18 which comprises a ring-form mount portion 19 and an integral arm portion 20 extending radially from the mount portion 19. The mount portion 19 is provided with an opening 21 fitting intimately on the non-flanged end of the cylindrical portion 13 of the rotary member 12 for co-rotation therewith. More particularly, the opening 21 is defined by an arcuate surface 21a corresponding to the outer circumferential surface of the cylindrical portion 13 of the rotary member 12 as well as by a flat surface 21b corresponding to the flat surface 16 of the rotary member 12.

The mount portion 19 of the lever 18 is further provided with a stopper projection 22 which engages with a portion of the first caliper 2 adjacent to the boss 10 when the lever 18 is pivoted to its lower limit position. Such portion of the first caliper 2 is designated by reference numeral 23 in FIG. 5.

The first cable retainer 8 comprises a retainer body 24, a clamping screw 25 and a cap nut 26.

The retainer body 24 has a shaft 24a rotatably inserted into the eccentric axial bore 15 of the rotary member 12. The retainer body 24 further has an intermediate flange 24b from which a bracket 24c extends in a direction opposite to the shaft 24a. In an assembled state, the intermediate flange 24b comes into abutment with the ring-form mount portion 19 of the lever 18. The bracket 24c is formed with a cable anchoring groove 24d and a through-hole 24e.

The retainer body 24 is mounted to the rotary member 12 by a set screw 27 inserted into a threaded bore 24f formed coaxially in the shaft 24a.

The clamping screw 25 has a threaded shank 25a and a clamping head 25b. The threaded shank 25a is screwed into a threaded bore 26a of the cap nut 26 through the through-hole 24e of the bracket 24c, whereby the clamping head 25b presses and holds the inner cable w1 in the anchoring groove 24d of the bracket 24c as illustrated in FIG. 6.

A corrugated ring spring 28 is interposed between the flat end face 10a of the boss 10 and the ring-form mount portion 19 of the lever 18. The ring spring 28 urges the rotary member 12 in such a direction that the first annular row 11 of teeth on the boss 10 comes into intimate engagement with the second annular row 17 of teeth on the rotary member 12. However, since the rotary member 12 is axially movable within a limited range as described hereinbefore, the rotary member 12 can be clickingly rotated against the urging force of the ring spring 28 by forcibly pivoting the lever 18.

In braking operation with the first cable retainer 8 brought-to a lower dead point by pivoting the adjusting lever 18 in the direction of an arrow B in FIG. 1, the unillustrated brake lever is operated to pull up the inner cable w1 as indicated by an arrow X and thereby to reduce the distance between the respective free ends of the connecting portions 2b, 3b of the calipers 2, 3. As a result, the shoe support potions 2a, 3a of the calipers 2, 3 move toward each other as indicated by arrows P to bring the respective brake shoes 4, 5 into braking contact with the side walls of the rim R.

When the unillustrated brake lever is liberated, the inner cable w1 is extended through the outer cable w2 as indicated by an arrow Y. This results in that the brake shoes 4, 5 move out of contact with the wheel rim R to free the wheel from a braking force.

In the non-braking position shown in FIG. 1, the first cable retainer 8 is in its lower dead point, so that any tensile force acting on the inner cable w1 does not cause the retainer 8 nor the rotary member 12 (FIGS. 4 to 6) to rotate in the arrow A direction. Further, even if a rotational force is unexpectedly applied to the rotary member 12 due, for example, to a slight deviation of the retainer 8 from its exact lower dead point, such rotational force does not result in actual rotation of the rotary member 12 because of engagement between the first and second rows 11, 17 of teeth.

On the other hand, in the non-braking position shown in FIG. 1, the interval between the two brake shoes 4, 5 is smaller than the width (cross-sectional diameter) of the tire T. Thus, it is impossible in this condition to disassemble the wheel for replacement or repair.

According to the present invention, the rotary member 12 (FIGS. 4 to 6) is forcibly rotatable by pivoting the adjusting lever 18 because the rotary member 12 is axially movable in the boss 10. More specifically, when the lever 18 is pivoted to rotate the rotary member 12, the second row teeth 17 of the rotary member 12, which is initially in engagement with the first row teeth 11 of the boss 10 at a certain angular position as indicated by solid lines in FIG. 7, disengage from the first row teeth 11 by axial movement of the rotary member against the biasing force of the corrugated ring spring 28 as indicated by phantom lines in FIG. 7 and again engage therewith at another angular position by reverse axial movement of the rotary member 12.

Thus, for disassembling the wheel, the adjusting lever 18 is clickingly pivoted from the lower limit position of FIG. 1 to the upper limit position of FIG. 2, causing the first cable retainer 8 mounted eccentrically on the rotary member 12 to displace to its upper dead point. As a result, the distance between the respective free ends of the connecting portions 2b, 3b of the calipers 2, 3 increases to enlarge the spacing between the two brake shoes 4, 5 to a degree enough for free passage of the tire T. Naturally, such operation can be conducted very quickly by simple pivoting of the adjusting lever 18.

Alternatively, the adjusting lever 18 may be clickingly pivoted to any angular position between the lower and upper limit positions. The engagement between the first row teeth 11 and the second row teeth 17 allows the lever 18 (hence the first cable retainer 8) to be retained at such pivoted position despite the tensile force acting on the inner cable w1 because the eccentricity of the axial bore 15 is not so large as to produce a large rotational moment. Thus, it is possible to conduct braking operation with the adjusting lever 18 held at optional angular position and thereby to provide a desired play in braking operation depending on the requirements of a particular cyclist.

The rotational resistance of the rotary member 12 relative to the boss 10 provided by the engagement between the first teeth 11 and the second row teeth 17 is determined by the inclination of tooth surfaces 11a, 11b, 17a, 17b (FIG. 7) as well as by the urging force of the corrugated ring spring 28 (FIGS. 4 to 6).

Figure 7:
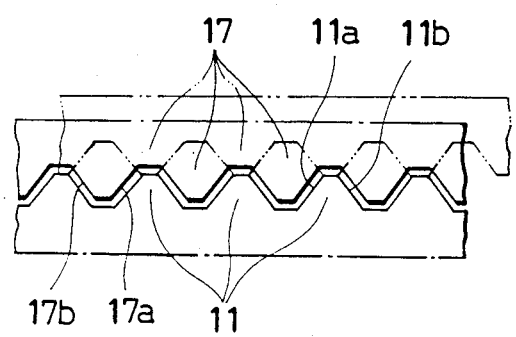
FIG. 7 is an illustrative view showing a first row of teeth and a second row of teeth in and out of engagement with each other.

In the example shown in FIG. 7, the tooth surfaces 11a, 11b for the first row teeth 11 is equal in inclination angle, as also are the tooth surfaces 17a, 17b for the second row teeth 17. In this case, the rotational resistance of the rotary member 12 is equal in both of the rotational directions A, B (FIGS. 1 and 2).

Figure 8:
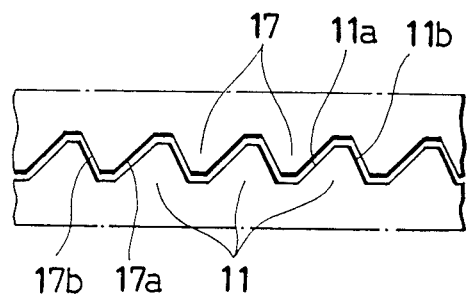
FIG. 8 is a view similar to FIG. 7 showing another example of a first row of teeth in engagement with another example of a second row of teeth.

In another example shown in FIG. 8, the tooth surface 11a on one side of each first row tooth 11 differs in inclination angle from the tooth surface 11b on the other side. Similarly, the tooth surface 17a on one side of each second row tooth 17 is different in inclination angle from the tooth surface 17b on the other side. According to this example, it is possible to provide a greater rotational resistance in the upward pivotal direction A of the adjusting lever 18 than in the downward pivotal direction B, which ensures a much higher safety by preventing unexpected upward pivotal movement of the lever 18 upon braking operation.

The invention being thus described, it will be obvious that the same may be varied in many ways. For instance, the corrugated ring spring 28 may be replaced by a Belleville spring or some other elastic means. Further, the teeth of the first and second rows 11, 17 are optional in shape and number. Such variations are not to be regarded as a departure from the spirit and scope of the invention, and all such modifications as would be obvious to those skilled in the art are intended to be included within the scope of the invention.

I claim:
1. A bicycle caliper brake assembly comprising:
first and second calipers each pivotally supported by a support shaft,
said calipers respectively having shoe support portions which support a pair of brake shoes on both sides of a bicycle wheel rim and which are always biased away from each other,
said second caliper having a connecting portion connected to an outer cable of a double type control cable,
said first caliper having a connecting portion provided with a boss,
a rotary member rotatably fitted in said boss and axially movable in said boss within a limited range,
a pivotal adjusting lever for rotating said rotary member within a limited range, a cable retainer which is mounted eccentrically on said rotary member for connection to an inner cable of said control cable and which is displaced between a lower dead point and an upper dead point when said rotary member is rotated by said lever, said boss being formed at one end thereof with a first annular row of teeth, said rotary member being formed with a second annular row of teeth which is engageable with and disengageable from said first row of teeth in response to axial movement of said rotary member, and elastic means for urging said rotary member to bring said second row of teeth into engagement with said first row of teeth.

2. The caliper brake assembly as defined in claim 1, wherein said first row of teeth are formed on one end face of said boss at said one end thereof.

3. The caliper brake assembly as defined in claim 2, wherein said rotary member has a cylindrical portion and a an annular flange positioned at one end of said cylindrical portion in facing relation to said one end face of said boss, and said second row of teeth are formed on one side surface of said flange facing said one end face of said boss.

4. The caliper brake assembly as defined in claim 1, wherein said first row of teeth and said second row of teeth extend radially.

5. The caliper brake assembly as defined in claim 1, wherein each of said first row teeth and said second row teeth has a pair of tooth surfaces which are equal in inclination angle.

6. The caliper brake assembly as defined in claim 1, wherein each of said first row teeth and said second row teeth has a pair of tooth surfaces which differ from each other in inclination angle.

7. The caliper brake assembly as defined in claim 1, wherein said elastic means is in the form of a corrugated ring spring which is interposed between said lever and the other end of said boss.

8. The caliper brake assembly as defined in claim 1, wherein said rotary member is formed with an eccentric axial bore, and said cable retainer has a shaft rotatably inserted into said axial bore.

* * * * *